Figure 4:
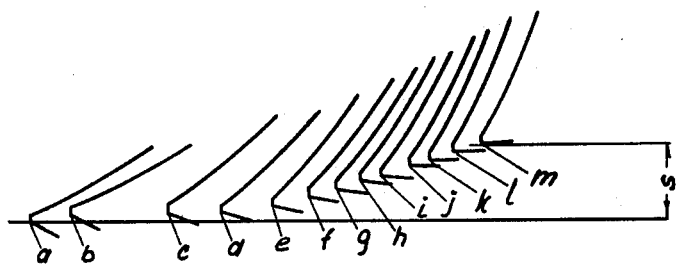

Dec. 28, 1965  A. ANDERSEN  3,225,840
RESILIENT HARROW TOOTH
Filed April 21, 1964  2 Sheets-Sheet 1
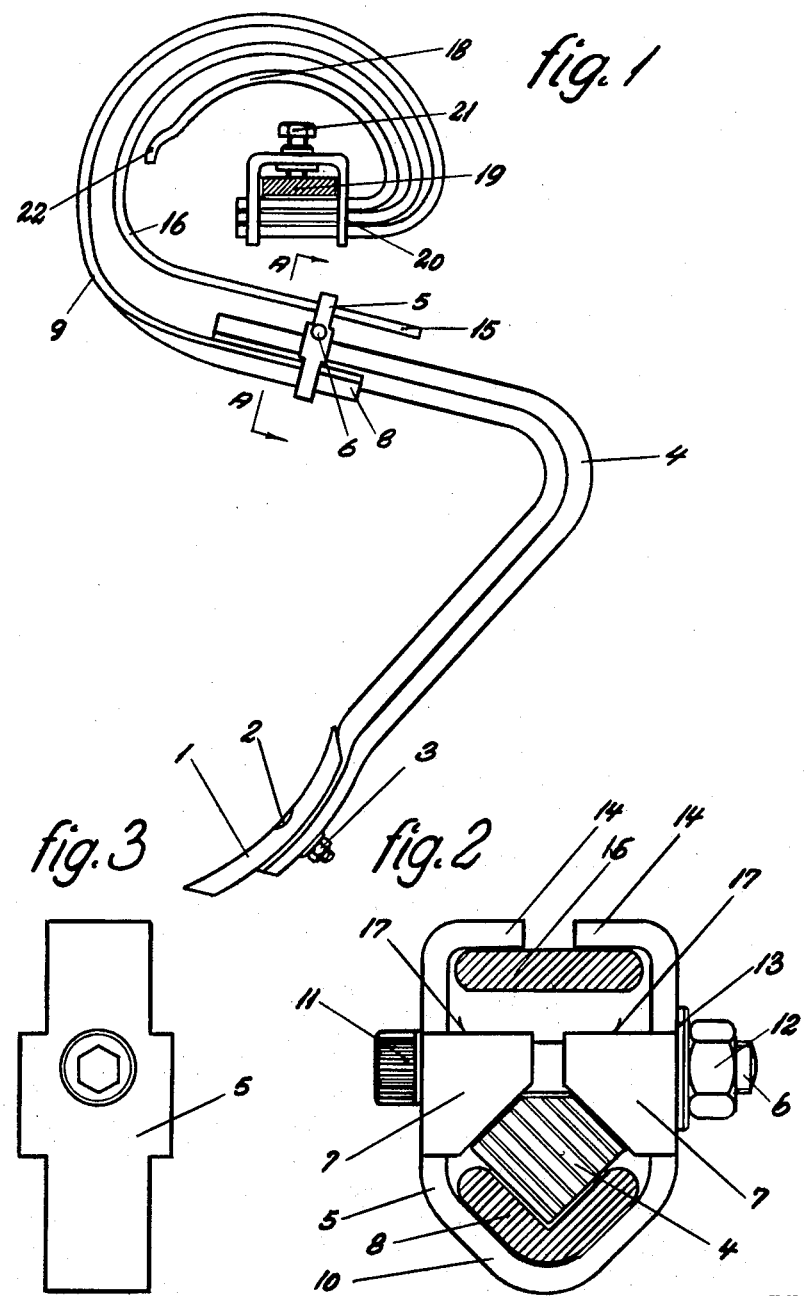
INVENTOR.
ANDERS ANDERSEN
BY
Edward F. Levy
ATTORNEY United States Patent Office
3,225,840
Patented Dec. 28, 1965

3,225,840
RESILIENT HARROW TOOTH
Anders Andersen, Godthaab, Denmark, assignor to A/S
A. Andersens Staalvarefabrik, Godthaab, Denmark
Filed Apr. 21, 1964, Ser. No. 361,487
Claims priority, application Denmark, May 4, 1963,
1,055
4 Claims. (Cl. 172—708)

The present invention relates to a resilient tooth of a harrow (cultivator tooth), the upper part of which consists of several leaf springs at one end bolted onto the body of a harrow frame, and designed in such a way that the soil working means of the tooth are secured on the foremost leaf spring viewed from the travelling direction, while the free ends of the hindermost leaf springs are out of touch with the leaf springs in front, respectively are out of touch with the backs of the soil working means of the tooth.

Teeth of this kind may be made with powerful springs for use on heavy autumn harrows, stub cultivators, or the like implements used for stirring stubble, grass and the like, into the soil, for which purpose is required a heavy harrow with sturdy and deep working teeth.

If on the other hand a seed-bed is to be prepared for sowing in spring, a light harrow with weaker springs and teeth working only in the more superficial layers of the soil must be used in order to avoid desiccation of the humidity of the soil, which may be rather scarce in winter and spring. The spring harrow must be provided with teeth responding comparatively vigorously to even small loads as otherwise it cannot clear itself of rootlets and the like.

In recent years, however, one frequently has met the request for an implement that could perform the spring as well as the autumn harrowing, e.g. by an alteration in the weight load or another simple adjustment.

It is the object of the present invention to indicate a tooth rendering possible the construction of such a harrowing implement, suitable for light as well as for heavy harrowing, and designed in such a manner as will give full utilization of the springs in their very length, and in a manner that will ensure a uniform reaction of all the teeth of the harrowing implement to equally large pressures of soil, and so that the risk of breakage of the teeth even at severe, or possibly eccentric, impacts or blows will be reduced to a minimum.

The resilient tooth according to this invention is constructed so that it is provided with three leaf springs, the second of these reaching down to the back of the soil working means, the latter being provided with a rest for the front of the second leaf spring, while the hindermost spring is shorter and is provided with a ledge-like protrusion at its free end affording a point of touch for the back of the second spring.

By this arrangement is achieved an adequate, stepped elastic force when the pressure of the soil is increased, whether the increase is continuous or due to a sudden influence. The resting point as well as the ledge-like protrusion serve as means for securing the utilization of the full length of the springs, irrespective of the fact that they are positioned at very small distances from one another, and irrespective of minor inaccuracies in design and in the manufacturing process.

For the purpose of light harrowing when the tooth is working rather superficially such a tooth—which is rather long compared with its thickness and in consequence thereof softly resilient—will react sufficiently subdued as only its first or front leaf spring will be actuated during normal spring harrowing. Should the tooth of the harrow strike against a hard lump of soil or a like obstacle one or both of the auxiliary leaf springs will be actuated. In case of heavy harrowing with deep-set teeth all three leaf springs will immediately be actuated, as the load on the tooth for the purpose of normal heavy autumn harrowing is so heavy that the gap or clerance between the individual leaf springs will be closed from the very start.

The second leaf spring positioned right behind the first or front spring is preferably made as long as, or longer than the first or front spring. In case of heavy, and in particular heavy eccentric, loading of the tooth, this second spring will therefore be exposed to the risk of slipping outside the first spring resulting in a sudden discontinuation of the support afforded by the second spring and a subsequent and consequential breaking of the tooth.

In order to avoid this the tooth of the harrow according to the invention may be designed in such a manner that the resting point is constructed to serve as a lateral guide as well and dimensioned so as to afford some clearance at the narrow edges of the second leaf spring.

An embodiment of the tooth according to the invention will now be further explained with reference to the drawing, in which FIG. 1 shows a tooth in side view,
FIG. 2 an enlarged section along the line A—A in FIG. 1,
FIG. 3 a detail viewed in the same direction as in FIG. 1, but drawn on a scale corresponding to FIG. 2,
FIG. 4 a survey of the resilient action of a known tooth, and
FIG. 5 a corresponding survey of the resilient action of a tooth according to the invention.

Point 1 of the tooth, drop-forged like a curving V-section, is by means of a counter-sunk bolt 2 with matching nut 3 bolted onto a very sturdy tooth component 4 made of square spring steel. The tooth component 4 has at its lower end been forged down to a dimension corresponding to that of the tooth point 1, so that the upper side of the latter (the front side) will be level with the front side of the tooth component 4. This tooth component 4 and the tooth point 1 together make up the soil working means of the tooth of the harrow.

Around the upper part of the tooth component 4 is a strap or clamp 5 tightened by means of a clamping bolt 6 let into a semi-circular notch at the back (upper side) of the tooth component 4, which component is further secured by means of two pairs of inwardly bent clamping flaps 7 in the strap, so that their narrow edges are pressed against the oblique backs (upper sides) of the tooth component 4, while at the same time the oblique fronts (lower sides) of the said component 4 are embedded in a lower part 8—forged in a V-section—of the foremost or first leaf spring 9 (main spring) which on the front (lower side) is resting in the V-strap 10 of the clamp. The clamping bolt 6 is a hardened steel screw of great tensile strength and provided with an internal hexagon in a knurled head 11. At the end opposite to the bolt head 11, the bolt is tightened by means of a nut 12 resting on a washer 13.

At the top (on the back) the clamp 5 is provided with a pair of inwardly bent guiding flaps 14 embracing with some clearance a lower part 15 of a second leaf spring 16 (first auxiliary spring). When the tooth of the harrow is unloaded, the part 15 rests against the lower side (inner side) of the guiding flaps 14. When on the other hand the tooth is heavily loaded, part 15 of the leaf spring 16 will rest on the upper sides of the clamping flaps 7 designed and constructed as resting surfaces 17.

The upper part of the leaf springs 9 and 16 together with a corresponding part of a third leaf spring 18 (second auxiliary spring) are clamped up against a cross-bar 19 in a harrow chassis, not shown in this drawing, by means of a clamp 20 and a bolt 21.

The third leaf spring 18 in its free end has a forged protrusion 22 facing towards the second spring 16 in front of it. When the harrow tooth is unloaded, there will be clearance between the protrusion 22 and the spring 16. When the tooth is heavily loaded, i.e. when the load is somewhat increased beyond the point when the spring part 15 is brought to rest against the resting surfaces 17, the back of the spring 16 will be brought to rest against the protrusion 22, and consequently also the spring 18 will contribute to the support of the tooth.

Figure 5:
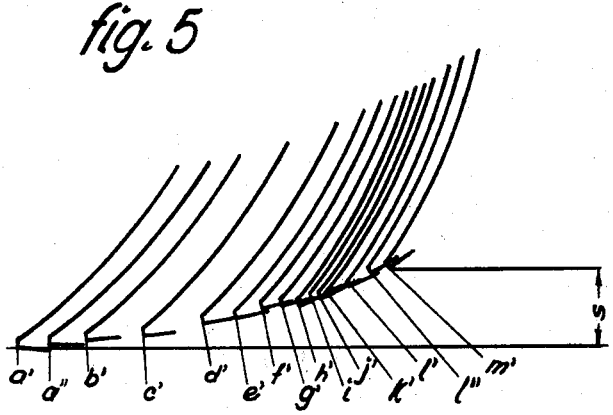

As an illustration of the suitability of the new type of tooth for light as well as for heavy harrowing, FIGS. 4 and 5 show surveys of the resilient reaction of a known resilient tooth, and of this new tooth respectively, at chosen loads.

The references $a$–$m$ in FIG. 4 show a sequence of positions of the tooth point of the known tooth at stepwise increased loads.

Correspondingly the references $a'$, $a''$, $b'$, $l'$, $l''$ and $m''$ show a sequence of positions of the tooth point of the new tooth at stepwise increased leads on this new tooth.

For easy reading a table of references and corresponding tooth loads is arranged below. In this connection it is to be noted that the max. vertical spring effect (at $m$ and $m''$ respectively) is 59 mm. for both teeth.

| Position of point of known tooth | Position of point of new tooth | Vertical tooth pressure, kilogrammes | Remarks |
|---|---|---|---|
| $a$ | $a'$ | 0 | No deflection. |
| — | $a''$ | 12 | At this load the spring 16 is actuated. |
| $b$ | $b'$ | 25 | — |
| $c$ | $c'$ | 50 | At this load the spring 18 is actuated. |
| $d$ | $b'$ | 75 | — |
| $e$ | $e'$ | 100 | — |
| $f$ | $f'$ | 125 | — |
| $g$ | $g'$ | 150 | — |
| $h$ | $h'$ | 175 | — |
| $i$ | $i'$ | 200 | — |
| $j$ | $j'$ | 225 | — |
| $k$ | $k'$ | 250 | — |
| $l$ | $l'$ | 300 | — |
| — | $l''$ | 350 | — |
| $m$ | — | 375 | 59 mm. vertical deflection. |
| — | $m''$ | 400 | 59 mm. vertical deflection. |

A dash (—) in a column means that the space in question is not used.

A comparison of the above table with the surveys clearly shows that the new tooth has a soft ("long") initial spring effect and a hard ("short" compressed) final effect compared with the effects of the known tooth.

Looking at the horizontal deflections it is thus noted that the new tooth will be deflected at the rate of approx. 25 mm. at 12 kilogrammes, and approx. 52 mm. at 25 kilogrammes of load ($a'$–$a''$ and $a'$–$b'$ respectively), while the known tooth was deflected at the rate of about 33 mm. only at 25 kilogrammes of load.

The new tooth will be deflected at the rate of approx. 98 mm. ($a'$–$c'$), and the known tooth approx. 87 mm. both at 50 kilogrammes of load.

As far as the latter part of the load test is concerned, the position is reversed, the new tooth being considerably more rigid at heavy loads than the known tooth. When comparing for instance the deflections due to load increases from 50–300 kilogrammes, we note that this increase of load by 250 kilogrammes results in an increased horizontal deflection of the known tooth at the rate of approximately 217 mm. as against an increased deflection at a rate of only approx. 156 mm. of the new tooth for a corresponding increase of load.

What I claim is:

1. A resilient tooth assembly for a harrow having a frame, said tooth assembly comprising a primary resilient soil working member including a main leaf spring carrying a tooth point at the free end portion thereof, the other end of said main leaf spring being secured to said harrow frame, and an auxiliary leaf spring mounted on said harrow frame and extending adjacent to and spaced from said main spring, said auxiliary leaf spring having a free end portion shaped to make flush engagement with a portion of said primary soil-working member and a bracket member carried by said primary soil working member and normally holding the free end portion of said auxiliary leaf spring spaced a selected distance rearwardly from said primary soil working member, the free end portion of said main leaf spring moving rearwardly when a predetermined load is applied to said tooth point whereby a portion of said primary soil working member initially engages the free end portions only of said auxiliary spring whereby a stepwise increased resistive force is applied to said tooth point in opposition to said predetermined load.

2. A resilient tooth assembly for a harrow having a frame, said tooth assembly comprising a primary soil working member including a main leaf spring carrying a tooth point at the free end portion thereof, the other end of said main leaf spring being secured to said harrow frame, and an auxiliary leaf spring mounted at one end on said harrow frame and extending adjacent to and spaced from the main leaf spring, of said auxiliary leaf spring having a free end portion shaped to make flush engagement with a portion of said primary soil-working member and bracket means normally holding the free end portion of said auxiliary leaf spring spaced a selected distance behind the free end portion of said primary soil working member adjacent said tooth point, said main leaf spring serving as the sole resilient mount for said tooth point under relatively light soil-working loads upon the latter, and said primary soil working member remaining spaced from said auxiliary leaf spring, said main leaf spring under relatively heavier soil working loads flexing sufficiently to move the free end portion of the primary soil working member into engagement with the free end portion of the auxiliary leaf spring only whereby the tension of both leaf springs is applied to said tooth point in a stepwise increased force.

3. A resilient tooth assembly according to claim 2 in which said bracket means comprises a clamp member mounting the tooth point on the free end of said main leaf spring, said clamp member including a pair of spaced guiding arms receiving the free end portion of said auxiliary leaf spring for free movement of the latter between said arms, said clamp member having a transverse surface positioned to engage said auxiliary leaf spring when said main leaf spring is flexed under said relatively heavier soil-working loads, said guiding arms being spaced apart a distance slightly greater than the width of the auxiliary leaf spring free end portion located therebetween, to restrain the free end portion of the auxiliary leaf spring from movement laterally out of registry with the primary soil working member, said clamp member further including transverse arms engaging the upper surface of said auxiliary leaf spring to maintain said main leaf spring in predetermined spaced relation to the auxiliary leaf spring when no load is applied to said tooth point.

4. A resilient tooth assembly for a harrow having a frame, said tooth assembly comprising a primary soil working member including a main leaf spring carrying a tooth point at the free end portion thereof, the other end of said main leaf spring being secured to said harrow frame, an auxiliary leaf spring mounted at one end on said harrow frame and extending adjacent to and spaced from the main leaf spring, said auxiliary leaf spring having a free end portion shaped to make flush engagement with a portion of said primary soil working member and holding the free end portion of said auxiliary leaf spring normally spaced a selected distance behind the free end portion of said primary soil working member adjacent said tooth point, said main leaf spring serving as the sole resilient mount for said tooth point under relatively light soil-working loads upon the latter, and said primary soil working member remaining spaced from said auxiliary leaf spring, said main leaf spring under relatively heavier soil working loads flexing sufficiently to move the free end portion of the primary soil working member into engagement with the free end portion of the auxiliary leaf spring whereby the tension of both leaf springs is applied to said tooth point, and a third leaf spring mounted at one end on said harrow frame and extending adjacent to and spaced rearwardly of said auxiliary leaf spring, said third leaf spring being shorter than said auxiliary leaf spring and main leaf spring and having a free end portion provided with a forwardly extending protrusion spaced rearwardly of and registering with an intermediate portion of said auxiliary leaf spring, whereby said auxiliary leaf spring in flexing rearwardly under still heavier soil-working loads engages said protrusion and flexes said third leaf spring.

References Cited by the Examiner

UNITED STATES PATENTS 380,948   4/1888   Shank _____ 172—707 X

FOREIGN PATENTS 42,761   8/1930   Denmark.
1,236,569   6/1960   France.
1,120,197   12/1961   Germany.
946,723   1/1964   Great Britain.

ABRAHAM G. STONE, *Primary Examiner.*

T. GRAHAM CRAVER, ANTONIO F. GUIDA,
*Examiners.*

J. R. OAKS, *Assistant Examiner.*